(12) United States Patent
Tanioka

(10) Patent No.: US 7,982,933 B2
(45) Date of Patent: Jul. 19, 2011

(54) DRIVE CONTROL METHOD FOR GALVANO-SCANNER

(75) Inventor: Nozomu Tanioka, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 478 days.

(21) Appl. No.: 12/297,936

(22) PCT Filed: May 30, 2007

(86) PCT No.: PCT/JP2007/000586
§ 371 (c)(1),
(2), (4) Date: Oct. 21, 2008

(87) PCT Pub. No.: WO2008/146337
PCT Pub. Date: Dec. 4, 2008

(65) Prior Publication Data
US 2010/0172004 A1    Jul. 8, 2010

(51) Int. Cl.
*G02B 26/08* (2006.01)
(52) U.S. Cl. .................. 359/198.1; 359/199.1; 359/900
(58) Field of Classification Search .... 359/198.1–200.8; 347/243, 259–261; 250/559.29, 234–236; 219/121.78–121.81
See application file for complete search history.

(56) References Cited

U.S. PATENT DOCUMENTS

| 6,760,066 | B1 | 7/2004 | Kawamura et al. |
| 7,359,102 | B2 * | 4/2008 | Tanioka .................... 359/199.1 |
| 2005/0277305 | A1 | 12/2005 | Tanioka |

FOREIGN PATENT DOCUMENTS

| JP | 03-57489 U | 6/1991 |
| JP | 07-31119 A | 1/1995 |
| JP | 2000-069344 A | 3/2000 |
| JP | 2002-292483 A | 10/2002 |
| JP | 2003-220485 A | 8/2003 |
| JP | 3513489 | 1/2004 |
| JP | 2005-338450 A | 12/2005 |

OTHER PUBLICATIONS

International Search Report for corresponding application PCT/JP2007/000586, completed Aug. 28, 2007.

\* cited by examiner

*Primary Examiner* — James Phan
(74) *Attorney, Agent, or Firm* — Buchanan Ingersoll & Rooney PC

(57) ABSTRACT

A galvano-scanner system (1) has a position-controlling microcomputer (31) mounted on a scanner driver (3) of a galvano scanner (2), wherein a position detection signals outputted from a positional sensor (14) of the galvano-scanner (2) are sampled, the current position of the galvano-scanner (2) is updated on the basis of sampling results, when movement distance amount command data are input, the movement distance amount command data are converted to an address change amount for the galvano-scanner (2), the address change amount is added to the current position to obtain a movement destination address. The movement destination address is converted to an analog position command and supplied to a drive circuit (33). The drive circuit (33) generates position command voltage corresponding to the analog position command and causes to move the galvano scanner (2) by that movement distance. The galvano-scanner (2) can be controlled in a simple manner to move from a current position to an arbitrary position.

9 Claims, 2 Drawing Sheets

DRIVE CONTROL METHOD FOR GALVANO-SCANNER

TECHNICAL FIELD

The present invention relates to a drive control method for a galvano-scanner used in moving a laser beam irradiation position, or for other purposes, and particularly relates to a drive control method for a galvano-scanner that allows laser beam movement position to easily be modified.

BACKGROUND ART

Galvano-scanners that can move a laser beam at high speed are used in laser machining and the like. Analog circuits suitable for high-speed processing are used in scanner drivers for galvano-scanners. Analog drive circuits can process data at high speeds, but can only perform simple control, and are unsuited to processes such as complex calculations and parameter conversions.

In view of the above, a method is proposed in Patent Document 1 in which complex computations for controlling the movement position of a galvano-scanner are performed in a digital computer, and the galvano-scanner movement position is controlled by an analog circuit using feedback on the basis of the calculated result. In Patent Document 2, a microcomputer for generating commands in which digital data for expressing scanner operation patterns have been written is mounted in a scanner driver, the digital data of operation patterns outputted from the microcomputer undergo analog conversion, and the scanner is driven and controlled via an analog drive control circuit. On the other hand, an electromagnetic limited-rotation motor having a detector that can be used as a galvano-scanner for mirror scanning is disclosed in Patent Document 3
Patent Document 1: JP-B 3513489
Patent Document 2: JP-A 2005-338450
Patent Document 3: JP-A 07-31119

In the case that a laser beam or the like produced by a galvano-scanner is moved to an arbitrary position in relation to a point of origin of a sensor, a command voltage that corresponds to the movement distance from the point of origin of the sensor to the movement destination can be applied. For example, in the case that a command voltage of 1 V is set to correspond to a command position of 1° from the point of origin of the sensor, and a command voltage of 10 V is set to correspond to a command position of 10° from the point of origin of the sensor, a 4-V command voltage can be applied when the laser beam is to be moved to a position of 4° from the point of origin of the sensor.

However, when one desires to move the movement position of a laser beam or the like produced by the galvano-scanner from the current position to an arbitrary position, it is necessary to apply as a positioning command a command voltage that is generated on the basis of the movement distance from the current position of the galvano-scanner. In other words, it is necessary to monitor a positioning signal outputted from the sensor that is mounted on the galvano-scanner, generate a positioning command voltage for moving the galvano-scanner to the movement destination position in which the movement distance has been added to the current position, and apply the command voltage to the galvano-scanner.

For example, in the case that the current position is a position 1° from the point of origin of the sensor, and one desires to move the laser beam position 3° from the current position, it is necessary to detect the current position 1° with the aid of the sensor, add a movement distance of 3° to the 1°, calculate 4° as the movement destination position, generate a command voltage of 4 V that corresponds to 4°, and continuously output the 4-V command.

Here, in the case that the laser beam or the like is to be moved from a current position on the workpiece to an arbitrary position, a host controller provided with a joystick or another operating member for inputting a movement distance in order to move to the new position is required.

However, drive control of a galvano-scanner is control in which constant tracking is carried out in relation to a positioning command. Therefore, in the case that a joystick or another operating member is operated to input a movement distance, real-time commands are involved, and there are therefore occasions when, for example, the galvano-scanner moves on an unintended movement trajectory even in a simple movement such as movement between two points. There are also cases in which it is difficult to stabilize the beam at the target position.

DISCLOSURE OF THE INVENTION

In view of the above, an object of the present invention is to provide a drive control method for a galvano-scanner that can perform control to move a galvano-scanner in a simple manner from a current position to an arbitrary position.

In order to solve the above problems, a drive control method for a galvano-scanner of the present invention is characterized in that a position-controlling microcomputer is housed in a scanner driver of the galvano-scanner, wherein the position-controlling microcomputer operates so that:

position detection signals that are outputted from a position sensor of the galvano-scanner are sampled;

a current position address for expressing a current position of the galvano-scanner on the basis of sampling results is updated;

digital movement distance command data for designating a movement distance of the galvano-scanner are inputted from an exterior, whereupon the movement distance command data are converted to an address change amount for the galvano-scanner;

the address change amount is added to the current position, and a movement destination address is calculated; and the movement destination address is converted to an analog position command and is supplied to a drive circuit of the scanner driver, and wherein the drive circuit operates so that:

a position command voltage that corresponds to the analog position command is generated, and the galvano-scanner is moved in an amount commensurate with the movement distance.

In the present invention, the movement distance command data expressing the movement distance can be inputted to the position-controlling microcomputer housed in a scanner driver in the case that one desires to move a galvano-scanner. For example, in the case that the current position of the galvano-scanner is 1° and the movement distance is 3°, it is possible to input movement distance command data of 3° into the position-controlling microcomputer.

In the position-controlling microcomputer, the current position of the galvano-scanner is provided as feedback, and the galvano-scanner is moved via the drive circuit so that the galvano-scanner moves to a position designated by the inputted movement distance command data.

The galvano-scanner can be moved to a target position in a simple and reliable manner, and positioned there statically, in comparison with the case in which the galvano-scanner is made to move to an arbitrary position by operating a joystick or another operating member at the side of a host controller connected to the scanner driver to input a movement distance while the current position of the galvano-scanner is monitored.

It is preferred that digital data expressing operation patterns of the galvano-scanner are stored and held in advance in a storage part of the position-controlling microcomputer;

the position-controlling microcomputer sequentially outputs digital data for operation patterns when a trigger signal is input from the exterior, converts the digital data to an address change amount for the galvano-scanner, adds the address change amount to the current position address to calculate a movement destination address, and converts the movement destination address to an analog position command and supplied to a drive circuit of the scanner driver; and the drive circuit generates a position command voltage that corresponds to the analog position command, and moves the galvano-scanner in accordance with the operation patterns.

In this case, the movement area in which the galvano-scanner moves in specific operation patterns can be offset by input from the exterior in real time. In other words, in the case that movement command data are inputted in a state in which the galvano-scanner is being moved in accordance with the operation patterns, analog positional commands can be supplied from the position-controlling microcomputer to a drive circuit of the scanner driver so that the movement position of the galvano-scanner that moves in accordance with the operation patterns becomes a position offset by an amount commensurate with the movement amount designated by the movement distance command data.

Next, the galvano-scanner driver of the present invention is characterized in comprising:

a drive circuit for driving a galvano-scanner; and a position-controlling microcomputer, wherein the position-controlling microcomputer samples position detection signals outputted from the position sensor of the galvano-scanner, the current position address for expressing the current position of the galvano-scanner on the basis of sampling result is updated, and digital movement distance command data for designating a movement distance of the galvano-scanner are inputted from the exterior, whereupon the movement distance command data are converted to an address change amount for the galvano-scanner, the address change amount is added to the current position address to calculate a movement destination address, and the movement destination address is converted to an analog position command and supplied to a drive circuit; and the drive circuit generates a position command voltage that corresponds to the analog position command, and moves the galvano-scanner in an amount commensurate with the movement distance.

Also, the position-controlling microcomputer is characterized in being provided with a storage part for storing and holding digital data expressing operation patterns for the galvano-scanner, wherein the position-controlling microcomputer sequentially outputs digital data of the operation patterns when a trigger signal is input from the exterior, the digital data are converted to an address change amount for the galvano-scanner, the address change amount is added to the current position address to calculate a movement destination address, and the movement destination address is converted to an analog position command and supplied to a drive circuit; and the drive circuit generates a position command voltage that corresponds to the analog position command, and moves the galvano-scanner in accordance with the operation patterns.

The position-controlling microcomputer is characterized in that an analog positional command is supplied to the drive circuit so that the movement position of the galvano-scanner that moves in accordance with the operation patterns becomes a position offset by an amount commensurate with the movement amount designated by the movement distance command data, when movement distance command data are inputted in a state in which the galvano-scanner is being moved in accordance with operation patterns.

Next, the galvano-scanner system is characterized in comprising a galvano-scanner and a scanner driver for controllably drive the galvano-scanner, wherein the scanner driver is the scanner driver of the above configuration.

BEST MODE FOR CARRYING OUT THE INVENTION

Embodiments of the galvano-scanner system according to the present invention will be described below with reference to the diagrams.

Figure 1:
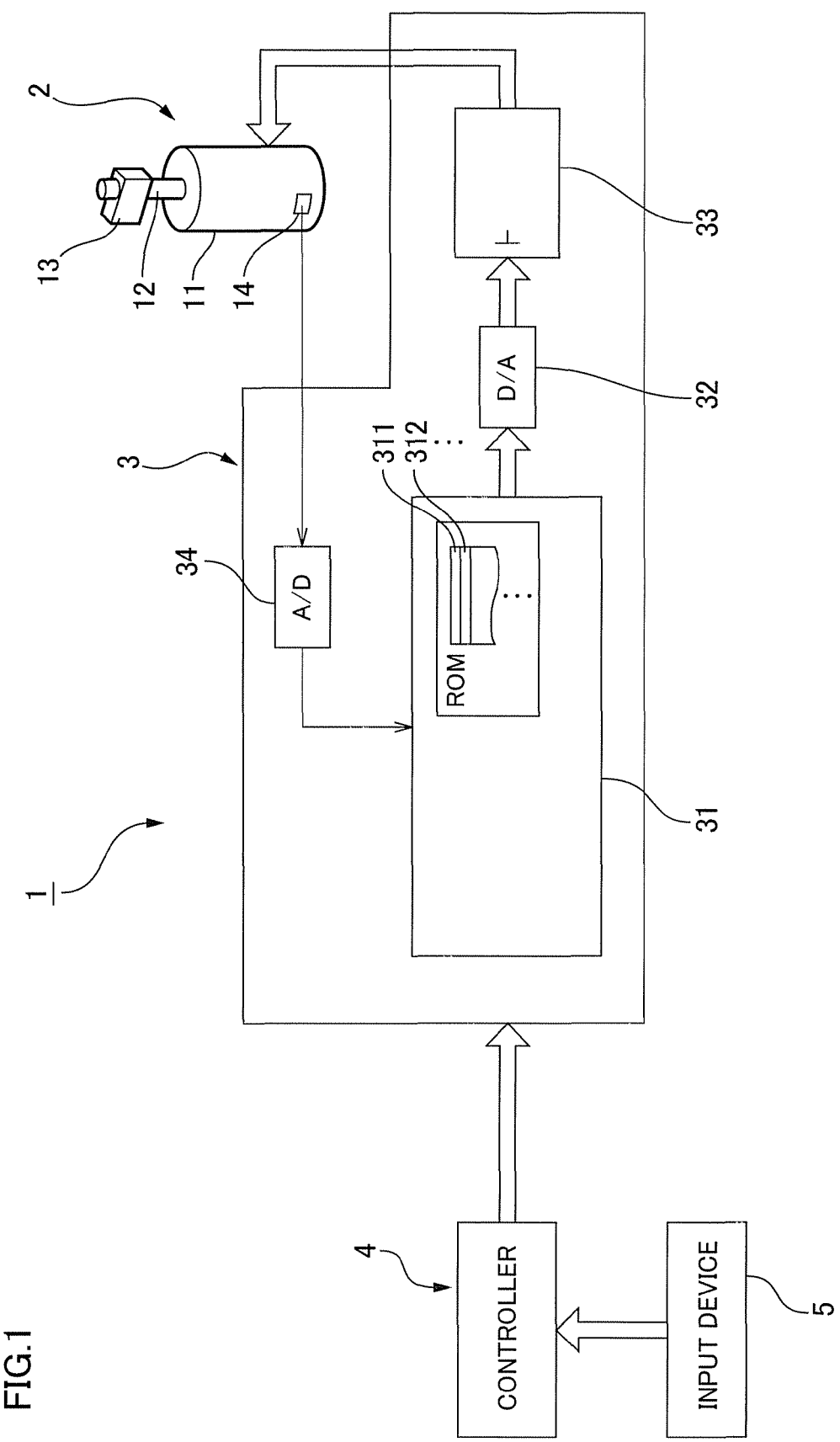
FIG. 1 is a schematic block diagram of a galvano-scanner system in which the present invention is applied.

FIG. 1 is a schematic block diagram of a galvano-scanner system. The galvano-scanner system 1 has a galvano-scanner 2 for scanning a laser beam, a scanner driver 3 for controllably drive the galvano-scanner, and a controller 4 for controllably driving the scanner driver 3.

The galvano-scanner 2 is provided with, e.g., a finite-rotation motor 11, and a scanning mirror 13 mounted on a rotating shaft 12 of the motor. A position sensor 14 for detecting a rotational angle position of the rotating shaft 12 of the motor is disposed on the galvano-scanner 2. Analog position detection signals of the position sensor 14 are supplied to the scanner driver 3.

The scanner driver 3 is provided with a microcomputer 31 for positional control, a D/A converter 32 for converting digital signal outputted from the microcomputer into analog signals, and a drive circuit 33 for generating scanner drive signals (position command voltages) on the basis of position command signals converted from analog signals, and applying the signals to the galvano-scanner 2. Also, an A/D converter 34 is provided for digitalizing analog positional detection signals from the position sensor 14 and supplying the signals to the microcomputer 31 for positional control.

The microcomputer 31 for positional control is provided with a CPU, a ROM, and a RAM; and a storage area is included in the ROM in which digital data 311, 312, . . . having a periodic arbitrary command input waveform are written. The digital data may be stored and held in a rewritable state.

An input device 5 is connected to the controller 4 and is configured so as to allow startup commands and movement distance commands to be inputted from the input device to the galvano-scanner 2.

Operation of this configuration of the galvano-scanner system 1 will be described. When an operation start command is inputted via the input device 5 by an operator, an input signal is inputted to the scanner driver 3 from the controller 4.

The position detection signals outputted from the positional sensor 14 of the galvano-scanner 2 are sampled at predetermined cycles in the microcomputer 31 for positional control of the scanner driver 3, and the current position of the galvano-scanner 2 is constantly monitored by updating the current position address expressing the current position of the galvano-scanner 2 on the basis of sampling results.

When an input signal is received, the microcomputer 31 for positional control sequentially outputs digital data of a command input waveform, e.g., digital data 311, from the ROM storage area in which predetermined command input waveforms are stored and held. The digital data thus outputted are converted to an address change amount for the galvano-scanner 2, the address change amount is added to the current position, and a movement destination address is calculated. Digital data expressing the movement destination address are converted to an analog position command via the D/A converter 32 and is thereafter supplied to the drive circuit 33.

The drive circuit 33 amplifies the analog signal thus supplied and performs other processing, generates a drive voltage that corresponds to the command input waveform, and applies the drive voltage to the galvano-scanner 2. The galvano-scanner 2 is thereby repeatedly driven in accordance with operation patterns that correspond to an input command waveform. For example, a laser beam is driven laterally by a scanning operation pattern at a fixed width in a predetermined planar field A, as shown in FIG. 2.

Figure 2:
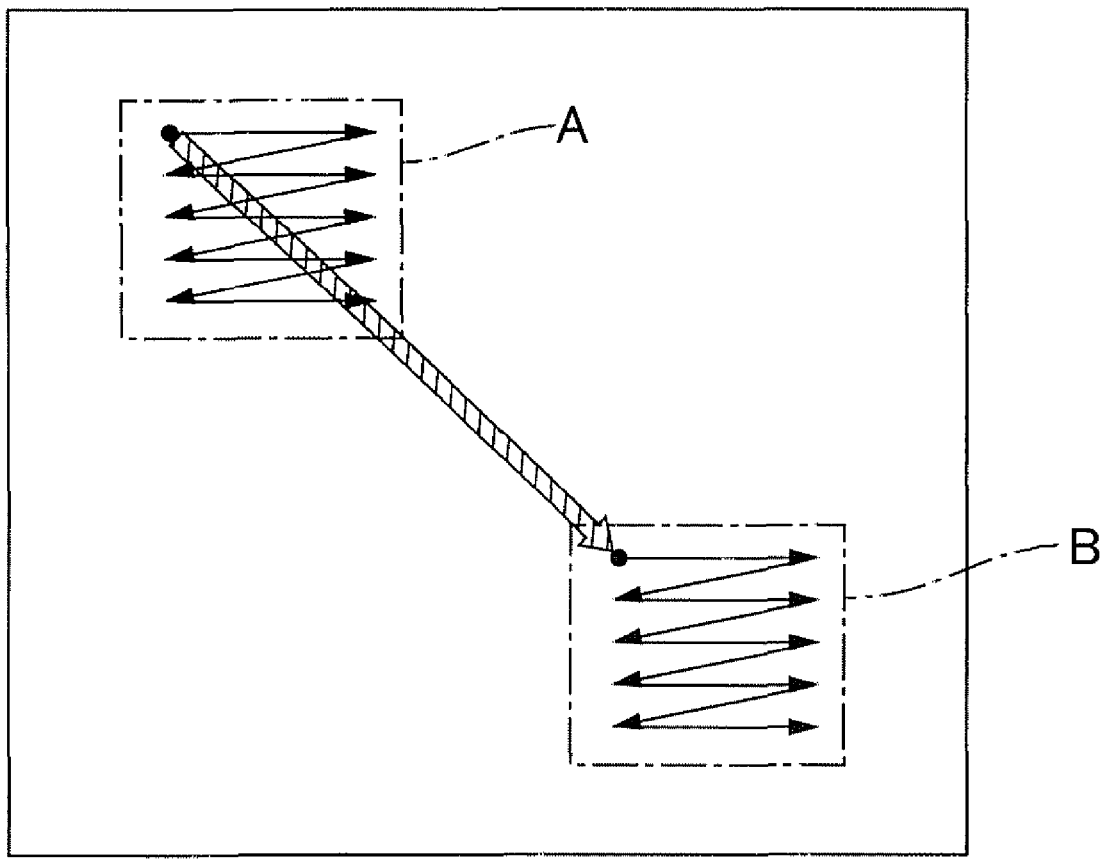
FIG. 2 is a schematic view for showing the operation of offsetting a scan area of a laser beam produced by a galvano-scanner.

Here, in the case that an operator desires to offset a laser scanning field from field A to field B in FIG. 2, the operator inputs movement distance command data expressing the movement distance via the input device 5. The inputted movement distance command data are supplied from the controller 4 to the microcomputer 31 for positional control of the scanner driver 3.

When movement distance command data for designating the movement distance of the galvano-scanner 2 are inputted, the microcomputer 31 for positional control converts the movement distance command data to an address change amount for the galvano-scanner, and the address change amount for the galvano-scanner is added onto the current position address to derive a movement destination address. The movement destination address is converted into an analog positioning command and supplied to the drive circuit 33. The drive circuit 33 generates a positioning command voltage that corresponds to the analog position command, and causes the galvano-scanner to move in an amount commensurate with the movement distance.

As a result, the scanning field of the laser beam produced by the galvano-scanner 2 is offset from field A to field B in real time, and the scanning operation of the laser beam is repeated using the same operation pattern in field B.

The invention claimed is:

1. A drive control method for a galvano-scanner, the method comprising:
    housing a position-controlling microcomputer in a scanner driver of the galvano-scanner, wherein the position-controlling microcomputer operates so that:
    position detection signals that are outputted from a position sensor of the galvano-scanner are sampled;
    a current position address for expressing a current position of the galvano-scanner on the basis of sampling results is updated;
    when digital movement distance command data for designating a movement distance of the galvano-scanner are inputted from an exterior, the digital movement distance command data are converted to an address change amount for the galvano-scanner;
    the address change amount is added to the current position address to obtain a movement destination address; and
    the movement destination address is converted to an analog position command and is supplied to a drive circuit of the scanner driver, and wherein the drive circuit operates so that:
    a position command voltage that corresponds to the analog position command is generated, and the galvano-scanner is moved in an amount commensurate with the movement distance.

2. The drive control method for a galvano-scanner according to claim 1, wherein
    digital data expressing operation patterns of the galvano-scanner are stored and held in advance in a storage part of the position-controlling microcomputer;
    the position-controlling microcomputer sequentially outputs digital data for operation patterns when a trigger signal is input from the exterior, converts the digital data to an address change amount for the galvano-scanner, adds the address change amount to the current position address to calculate a movement destination address, and converts the movement destination address to an analog position command and supplied to the drive circuit of the scanner driver; and
    the drive circuit generates a position command voltage that corresponds to the analog position command, and moves the galvano-scanner in accordance with the operation patterns.

3. The drive control method for a galvano-scanner according to claim 2, wherein
    when the movement distance command data are inputted in a state in which the galvano-scanner is being moved in accordance with the operation patterns,
    the position-controlling microcomputer supplies the analog position command to the drive circuit of the scanner driver so that the movement position of the galvano-scanner that moves in accordance with the operation patterns becomes a position offset by an amount commensurate with a movement amount designated by the movement distance command data.

4. A scanner driver of a galvano-scanner comprising:
    a drive circuit for driving the galvano-scanner; and
    a position-controlling microcomputer, wherein
    the position-controlling microcomputer samples position detection signals outputted from a position sensor of the galvano-scanner,
    updates a current position address for expressing a current position of the galvano-scanner on the basis of sampling result,
    when digital movement distance command data for designating a movement distance of the galvano-scanner are inputted from an exterior, converts the digital movement distance command data to an address change amount for the galvano-scanner,
    adds the address change amount to the current position address to obtain a movement destination address, and
    converts the movement destination address to an analog position command and supplied to the drive circuit, and wherein
    the drive circuit generates a position command voltage that corresponds to the analog position command, and moves the galvano-scanner in an amount commensurate with the movement distance.

5. The scanner driver for a galvano-scanner according to claim 4, wherein
    the position-controlling microcomputer has a storage part for storing and holding digital data expressing operation patterns for the galvano-scanner, wherein the position-controlling microcomputer sequentially outputs digital data of the operation patterns when a trigger signal is input from the exterior, converts the digital data to an address change amount for the galvano-scanner, adds the address change amount to the current position address to obtain the movement destination address, and converts the movement destination address to an analog position command and supplied to the drive circuit; and wherein the drive circuit generates a position command voltage that corresponds to the analog position command, and moves the galvano-scanner in accordance with the operation patterns.

6. The scanner driver for a galvano-scanner according to claim 5, wherein the position-controlling microcomputer supplies the analog positional command to the drive circuit so that the movement position of the galvano-scanner that moves in accordance with the operation patterns becomes a position offset by an amount commensurate with the movement amount designated by the movement distance command data, when movement distance command data are inputted in a state in which the galvano-scanner is being moved in accordance with the operation patterns.

7. A galvano-scanner system comprising
a galvano-scanner and
a scanner driver for controllably drive the galvano-scanner, wherein
the scanner driver is the scanner driver according to claim 4.

8. A galvano-scanner system comprising:
a galvano-scanner, and
a scanner driver for controllably drive the galvano-scanner, wherein
the scanner driver is the scanner driver according to claim 5.

9. A galvano-scanner system comprising:
a galvano-scanner, and
a scanner driver for controllably drive the galvano-scanner, wherein
the scanner driver is the scanner driver according to claim 6.

* * * * *